(12) United States Patent
Kessler et al.

(10) Patent No.: US 9,605,464 B2
(45) Date of Patent: Mar. 28, 2017

(54) DRIVE DEVICE

(75) Inventors: Jürgen Kessler, Montabaur (DE); Andreas Ritter, Hilgert (DE); Volker Neuhardt, Oberbachheim (DE); Sergei Mazepa, Kaisersesch (DE); Gisela Ursula Kessler, legal representative, Montabaur (DE)

(73) Assignee: Stabilus GmbH, Koblenz (DE)

( * ) Notice: Subject to any disclaimer, the term of this patent is extended or adjusted under 35 U.S.C. 154(b) by 306 days.

(21) Appl. No.: 14/343,842

(22) PCT Filed: Sep. 5, 2012

(86) PCT No.: PCT/EP2012/067304
§ 371 (c)(1),
(2), (4) Date: Jul. 24, 2014

(87) PCT Pub. No.: WO2013/037683
PCT Pub. Date: Mar. 21, 2013

(65) Prior Publication Data
US 2015/0040698 A1    Feb. 12, 2015

(30) Foreign Application Priority Data
Sep. 12, 2011   (DE) .................. 10 2011 082 540

(51) Int. Cl.
*H02K 15/03* (2006.01)
*H02K 5/04* (2006.01)
(Continued)

(52) U.S. Cl.
CPC .............. *E05F 15/18* (2013.01); *E05F 15/60* (2015.01); *E05F 15/622* (2015.01); *H02K 1/17* (2013.01);
(Continued)

(58) Field of Classification Search
CPC .. H02K 1/17; H02K 5/15; H02K 7/06; H02K 7/083; E05F 15/603; E05F 15/622;
(Continued)

(56) References Cited

U.S. PATENT DOCUMENTS 3,161,074 A * 12/1964 Korthaus ................. B61G 9/18
477/23
5,481,148 A    1/1996 Moribayashi et al.
(Continued)

FOREIGN PATENT DOCUMENTS

DE        3726413       2/1989
DE       19542453       5/1997
(Continued)

OTHER PUBLICATIONS

International Preliminary Report on Patentability of PCT/EP2012/067304 dated Mar. 20, 2014 including the Written Opinion translated into English.
(Continued)

*Primary Examiner* — William Kelleher
*Assistant Examiner* — Randell J Krug
(74) *Attorney, Agent, or Firm* — Rankin, Hill & Clark LLP

(57) ABSTRACT

A drive device, comprising a first housing part and a second housing part which can be displaced with respect thereto, and comprising a motor assembly, which comprises a rotor, two mounting elements and two permanent magnet shells, and if desired comprising a transmission assembly and/or a sensor unit associated with the motor transmission.

18 Claims, 9 Drawing Sheets

(51) Int. Cl.

| | | |
|---|---|---|
| *E05F 15/18* | (2006.01) | |
| *H02K 1/17* | (2006.01) | |
| *H02K 7/08* | (2006.01) | |
| *H02K 5/15* | (2006.01) | |
| *H02K 7/06* | (2006.01) | |
| *E05F 15/622* | (2015.01) | |
| *H02K 11/215* | (2016.01) | |
| *E05F 15/60* | (2015.01) | |
| *E05F 15/603* | (2015.01) | |
| *H02K 5/14* | (2006.01) | |

(52) U.S. Cl.
CPC ............... *H02K 5/15* (2013.01); *H02K 7/06* (2013.01); *H02K 7/083* (2013.01); *H02K 11/215* (2016.01); *E05F 15/603* (2015.01); *E05Y 2201/10* (2013.01); *E05Y 2201/434* (2013.01); *E05Y 2201/462* (2013.01); *E05Y 2900/546* (2013.01); *H02K 5/148* (2013.01); *Y10T 74/18568* (2015.01)

(58) Field of Classification Search
CPC ............... E05F 15/60; E05Y 2201/10; E05Y 2201/434; E05Y 2201/462; E05Y 2900/546
USPC ......... 74/89.23; 310/154.01, 154.03, 154.05, 310/154.06, 154.08, 154.17
See application file for complete search history.

(56) References Cited

U.S. PATENT DOCUMENTS

| | | | | |
|---|---|---|---|---|
| 5,968,563 | A | | 10/1999 | Hehl |
| 6,026,696 | A | | 2/2000 | Hehl |
| 6,155,817 | A | | 12/2000 | Hehl |
| 7,211,917 | B2 | * | 5/2007 | Akabane ................. H02K 1/17 310/154.03 |
| 2006/0196293 | A1 | * | 9/2006 | Gerhardt ............. F16H 25/2252 74/424.92 |
| 2007/0062119 | A1 | * | 3/2007 | Ritter .................... E05F 15/622 49/343 |
| 2007/0179006 | A1 | | 8/2007 | Kachouh |
| 2008/0060273 | A1 | * | 3/2008 | Bochen .................... H02K 7/06 49/340 |
| 2009/0076687 | A1 | * | 3/2009 | Enache ................. E05F 15/622 701/49 |
| 2009/0145036 | A1 | * | 6/2009 | Bochen ................. E05F 15/622 49/358 |
| 2009/0199668 | A1 | * | 8/2009 | Batosky ............. F16H 25/2015 74/424.71 |
| 2010/0037527 | A1 | * | 2/2010 | Bochen ............. F16H 25/2015 49/341 |
| 2010/0186528 | A1 | * | 7/2010 | Hillen .................... F16D 7/044 74/89.23 |
| 2011/0068721 | A1 | * | 3/2011 | Bochen ................. E05F 15/622 318/379 |
| 2012/0013143 | A1 | * | 1/2012 | Schiegel ............. E05F 15/622 296/146.4 |

FOREIGN PATENT DOCUMENTS

| | | | |
|---|---|---|---|
| DE | 102004054037 | 10/2006 | |
| DE | 102007054448 | 3/2009 | |
| EP | 0017524 | 10/1980 | |
| EP | 0017524 A1 * | 10/1980 | ............... H02K 1/17 |
| EP | 1300923 | 4/2003 | |
| EP | 1655513 | 5/2006 | |
| FR | 2430122 | 1/1980 | |

OTHER PUBLICATIONS

International Search Report of PCT/EP2012/067304 dated Jul. 18, 2013 (in English translation).
German Search Report of DE102011082540.1 dated Sep. 28, 2011.

* cited by examiner

DRIVE DEVICE

The invention relates to a drive device, comprising a first housing part, having an axle which can be connected to a stationary base part or to a movable component, a second housing part, which is arranged substantially coaxial with the first housing part, can be connected to the respective other part, in other words the movable component or the stationary base part, and is directly or indirectly displaceably guided on the first housing part, in an axial direction relative thereto, and a drive unit, which is received in the first housing part and comprises a motor assembly for bringing about a relative displacement movement of the first housing part and the second housing part, the motor assembly comprising a rotor having a rotor shaft, two mounting elements for mounting the two ends of the rotor shaft, and two permanent magnet shells which are held on the mounting elements.

Drive devices of this type are generally known. They are used in particular in motor vehicles for example for closing and opening bonnets, tailgates, boot lids, doors and similar pivotable elements. A conventional drive device is, for example, disclosed in DE 10 2007 054 448 B3, held by the Applicant. As well as the motor assembly, the drive unit of drive devices of this type generally also further has a transmission assembly, which reduces the rotational movement of the rotor of the motor assembly and passes it on to a positioning assembly of the drive device, for example a spindle drive, which derives therefrom the relative displacement movement of the first housing part and the second housing part. In this context, the two housing parts may for example, and may also according to the invention, be tubular in form, preferably in the form of a hollow circular cylinder.

In this technical field, there is a constant need to reduce manufacturing costs, increase performance and reduce the length of the drive unit. This desire to reduce the length of the drive unit exists because, for a given installation length of the drive device when fully retracted, the adjustment length of the drive device, in other words the difference between the lengths thereof when fully extended and when fully retracted, depends on the installation length of the drive unit which cannot be used for the extension.

The object of the present invention is therefore to improve the drive device of the conventional type in this regard.

In accordance with a first aspect of the invention, this object is achieved by a drive device of the conventional type in which the unit formed by the rotor, the two mounting elements and the two permanent magnet shells is received directly in the first housing part, and in that the first housing part is made of a magnetisable material, preferably steel, at least in a length portion associated with the motor assembly. In connection with the present invention, the expression "received directly" means that the motor assembly itself is free of yoke elements which magnetically connect the two permanent magnet shells. According to the invention, the function of the magnetic back iron is performed by the first housing part, which is made of a magnetisable material at least in the length portion associated with the motor assembly. Thus, the motor assembly itself does not form a functioning electric motor. This electric motor only comes about as a result of the motor assembly being received in the first housing part.

For the same external diameter as in the prior art drive devices, the absence of the pole well, which is responsible for the magnetic back iron, of the electric motors, which were previously installed as a complete functioning unit, saves radial installation space, which can be used for the permanent magnet shells. These can therefore take up a greater volume for the same installation length of the electric motor. This in turn makes it possible to produce them from a more cost-effective magnetic material of a lower magnetic field energy density, for example to form them as ferrite magnets, without a loss of nominal torque of the electric motor. By contrast, if the permanent magnet shells are made of a high-performance magnetic material, in other words a material of high magnetic field enemy density, for example if they are formed as neodymium magnets like the permanent magnet shells of conventional drive devices, the enlargement in radial installation space can be used to provide a higher nominal torque and/or to save installation length. However, it is also possible to form the drive device with a smaller diameter.

However, the construction according to the invention of the drive device has another, further advantage. As stated, the electric motors were previously installed as a complete functional unit. However, they were not only installed as a complete functional unit, but also obtained from a supplier as a complete functional unit. This meant that the electric motors were tested for functionality by the supplier, and this was of course reflected in the price of the electric motors. However, once the drive devices were fully mounted, they were tested for functionality again, specifically together with the other assemblies as a fully mounted drive device. Since according to the invention the electric motors are now only functional when fully mounted, specifically after being introduced into the first housing part, the aforementioned testing of the electric motors themselves is omitted. This has an advantageous effect on the manufacturing costs of the drive device according to the invention.

So as to be able to ensure the correct positioning of the permanent magnet shells in the circumferential direction around the rotor shaft in a simple manner, it is proposed in a development of the invention for at least one of the mounting elements to comprise at least one axial shoulder, which projects in between the permanent magnet shells. Advantageously, two axial shoulders of this type are provided, and are positioned diametrically opposite one another in the circumferential direction. Further, the two mounting elements may preferably comprise one or two axial shoulders of this type.

Once the rotor, the mounting elements and the permanent magnet shells of the motor assembly have been assembled to form a mounting unit, so as to be able to prevent the permanent magnet shells from falling off this mounting unit again, it is further proposed for at least one mounting element to comprise at least one holding projection for at least one of the permanent magnet shells, preferably both permanent magnet shells, the at least one holding projection cooperating in an interlocking manner, preferably at least in the radial direction, with the associated permanent magnet shell. The at least one holding projection may for example be integrally formed laterally on the at least one axial shoulder. In addition or alternatively, however, it is also possible for the at least one mounting element to comprise at least one holding projection for at least one of the permanent magnet shells, preferably both permanent magnet shells, on the and face. Further, the at least one holding projection may for example be formed in a step or wedge shape.

In the wedge-shaped embodiment, it is advantageous, in particular for a holding projection provided on the end face of the mounting element, if the wedge face of the holding projection cooperates with an associated counter wedge face of the at least one permanent magnet shell, which preferably extends over a vertical portion of the permanent magnet shell adjacent to the outer face of the at least one permanent magnet shell, both the wedge face and the counter wedge face preferably extending increasingly radially outwards in a direction pointing towards the respective other axial longitudinal end of the at least one permanent magnet shell. So as to be able to hold the at least one permanent magnet shell in a defined radial position on the mounting element, it is further advantageous for the permanent magnet shell to be positioned radially inwardly on a support face of the bearing element. As a result of the cooperation of this support face with the wedge face, the permanent magnet shell can be held securely and reliably by the mounting element. The same constructional measures which were described previously above for one axial longitudinal end of the permanent magnet shell may also be provided on the other axial longitudinal end of the permanent magnet shell, so as to be able to hold the permanent magnet shell securely on the associated mounting element.

Irrespective of the construction of the holding projection provided on the end face of the mounting element, it is advantageous for a resiliently compressible compensation element to be provided on at least one axial longitudinal end of the at least one permanent magnet shell between the permanent magnet shell and the mounting element. A compensation element of this type can compensate any manufacturing tolerances in the production of the mounting elements and in particular of the at least one permanent magnet shell in a simple manner by being compressed between the permanent magnet shell and the mounting element. This is advantageous in particular if both mounting elements are formed with axial shoulders, the free ends of which are positioned against one another when they are mounted. Generally, the mounting elements can be manufactured much more precisely than the permanent magnet shells, and so the mounting elements, the axial shoulders of which are positioned against one another, make it possible to pre-specify a predetermined installation length; and if the permanent magnet shell can only be produced with large manufacturing tolerances, this can be compensated by the compensation element in a simple manner whilst maintaining the pre-specified installation length.

It is advantageous, in particular, for the compensation element to be in the form of a ring extending over the entire circumference. Furthermore, the resilient compressibility of the compensation element need not necessarily be a property of the material of which it is made, for example rubber. Instead, it may also or alternatively be due to the shape of a compensation element which is formed for example from plastics material or metal. For example, the compensation element may comprise al least one undulating portion, the wave peaks of the compensation element being positioned against one part, the permanent magnet shell or the mounting element, whilst the wave troughs thereof are positioned against the respective other part, the mounting element or the permanent magnet shell. In this context, the term "undulation" is to be understood broadly, and is also intended to comprise for example a zigzag shape, in other words an undulation having sharp-edged wave peaks and wave troughs. In connection with the construction of the mounting element and the permanent magnet shell with a wedge face and a counter wedge face, the at least one wave-shaped portion on the diagonals of these faces may also be formed with a diagonal undulation. The at least one undulating portion may for example be arranged on the inner face of a ring, which is continuous in the circumferential direction and is for example not resiliently compressible.

In connection with the formation of at least one mounting element with at least one axial shoulder which projects in between the permanent magnet shells, it is proposed for two adjacent undulating portions of the compensation element to be connected by means of a circumferential portion of the ring, which is arranged radially outside the axial shoulder when mounted, whilst the two undulating portions are arranged adjacent to the two side faces of the axial shoulder in the peripheral direction. If this circumferential portion of the ring projects in the radial direction over peripheral portions adjacent thereto of the ring, it may for example come to be positioned against the inner face of the first housing part, and, in cooperation with other peripheral portions of the ring which project in an analogous manner, centre the motor assembly in the first housing part.

In accordance with a second aspect of the invention, in a conventional drive device in which the drive unit further comprises a transmission assembly which is connected to the output side of the motor assembly, the relative displacement movement of the first housing part and the second housing part being derived from a rotational movement of the output shaft of the transmission assembly, it may be provided that the mounting element of the motor assembly closest to the transmission assembly simultaneously forms the housing cover of the transmission assembly. As a result, on the one hand one component can be saved, and this has an advantageous effect on the production costs of the drive device according to the invention. On the other hand, however, as a result of one component being omitted, the drive unit can also be formed shorter, and this makes it possible to lengthen the adjustment path of the drive unit. Since this therefore also solves the initially stated object of the invention, independent protection is also sought for the second aspect of the invention.

To facilitate the assembly of the components of the mounting unit formed by the motor assembly and the transmission assembly, in a development of the second aspect of the invention it is proposed for the internal diameter of a central opening, for passing the rotor shaft through, of the mounting element of the motor assembly closest to the transmission assembly to be dimensioned at least as large as the external diameter of the input pinion of the transmission assembly. For example, as a first mounting step, the input pinion of the transmission assembly can be mounted on, for example pressed onto, the output end of the rotor shaft. Subsequently, the components of the motor assembly can be assembled, the input pinion of the transmission unit being passed through the correspondingly dimensioned central opening of the mounting element closest to the transmission assembly. Subsequently, if the components of the transmission assembly, excluding the input pinion and housing cover thereof, have also been assembled, in a final step the fully mounted motor assembly can be placed on the transmission assembly, effectively as a housing cover thereof.

In this connection, it should be noted that the expression "dimensioned at least as large" comprises any variant embodiment which makes it possible to pass the input pinion of the transmission assembly through the central opening of the mounting element. In other words, this expression is also intended to comprise embodiments which merely make brief widening of the central opening possible for the purpose of passing the input pinion through.

One fundamental problem to be overcome in drive devices of the conventional type is the development of noise resulting from vibrations of the drive unit during operation, for example because the motor assembly and/or the transmission assembly are striking against the first housing part as a result of vibrations. To solve this problem, in a development of the invention it is proposed for a damping element to be associated with at least one mounting element and/or the transmission assembly on the end thereof remote from the motor assembly. In this context, at least one damping element may be received in a circumferential groove. Damping elements which enclose the mounting unit formed by the motor assembly and the transmission assembly in the radial direction save axial construction space. At the same time, the gap between the motor assembly and the transmission assembly on the one hand and the first housing part on the other side, which is brought about by providing the damping elements and is important for reducing the development of noise, can be dimensioned small enough that it merely has a tolerable effect on the nominal torque of the electric motor.

The damping element or damping elements may for example be in the form of an O-ring which is preferably made of a resilient material. However, it is also possible to form at least one damping element in a disc shape or cup shape. With a view to reducing the total number of components of the drive unit, it is further advantageous for damping elements of this type only to be provided on the mounting element arranged remote from the transmission assembly and the end of the transmission assembly remote from the motor assembly.

In a development of the invention, at least one of the damping elements, which are provided on the mounting element arranged remote from the transmission assembly and the end of the transmission assembly remote from the motor assembly, can be used to brace the torque of the motor assembly and/or of the transmission assembly on the first housing part. For this purpose, the respective damping element may for example interlock both with the motor assembly or transmission assembly and with the first housing part.

As is known per se, the motor assembly of the drive device according to the invention may further comprise a sensor unit having a sensor sub-unit fixed to the rotor and a sensor lower sub-unit fixed to the stator. This sensor unit serves to detect the direction of rotation of the rotor and/or to detect the respective rotational position of the rotor and/or to detect the number of rotations already performed by the rotor. The sensor unit may for example comprise at least one Hall magnet and at least one Hall probe. In this context, both parts, the Hall magnet and the Hall probe, may be used both as the sensor sub-unit fixed to the rotor and as the sensor sub-unit fixed to the stator. However, it is advantageous to use the Hall magnet as the sensor sub-unit fixed to the rotor and the Hall sensor as the sensor lower unit fixed to the stator.

In principle, the sensor unit may be arranged on the end of the motor assembly remote from the transmission assembly, as is the case for example in the conventional drive device.

However, so as to facilitate the guidance and strain relief of the electrical lines guiding the sensor unit, the sensor unit may also be arranged between the motor assembly and the transmission assembly.

As a result, specifically portions in which the lines have to be diverted or grasped so as to provide the strain relief can be arranged at a distance from the soldered contact points. In this case, the electrical lines may for example be provided in the gap between the permanent magnet shells, in such a way that no additional radial constructional space is required. However, it is advantageous in this case to provide a separating shell in this gap, which may for example be formed integrally with one or both mounting elements so as to prevent contact between the rotor and the electrical lines. Since this arrangement of the sensor unit is likewise not known in the art, independent protection therefore is likewise sought in accordance with a third aspect of the invention.

Irrespective of the end of the motor assembly at which the sensor unit is arranged, it is advantageous for the sensor sub-unit which is fixed to the stator to be arranged radially outside the sensor sub-unit which is fixed to the rotor and/or to be arranged in an axial recess of one of the mounting elements. Specifically, this arrangement can save axial constructional space, which was conventionally required for arranging the sensor lower unit which is fixed to the stator. This can be made use of to reduce the constructional length of the drive unit.

In this connection, it should be added that the electrical connecting lines for the motor assembly can be introduced into the motor assembly at the end thereof facing the transmission assembly. Further, the electrical connecting lines to the motor assembly, and optionally to the sensor unit, may also be led away from the drive device in the axial direction. Alternatively, however, it is also possible to lead them away from the drive device in the radial direction.

To simplify the production of the permanent magnet shells, at least one of the permanent magnet shells may comprise at least two permanent magnet elements, which are for example held separate from one another on the mounting elements. As regards holding the permanent magnet elements on the mounting elements, what was stated regarding holding the permanent magnet shells on the mounting elements applies analogously. In particular, the mounting elements may also comprise axial shoulders which extend in between two adjacent permanent magnet elements.

It should also be added that the materials from which the components of the transmission assembly are formed may be selected quite generally from the group comprising the materials metal, preferably steel or brass, polyamide (PA) and polyoxymethylene (POM). Preferably, the input-side pinion may be formed from metal, for example steel or brass, or polyoxymethylene, the planet gears may be formed from polyamide, and the ring gear may be formed from polyoxymethylene. In a two-stage planetary transmission, the input pinion of the second stage may be formed from polyoxymethylene, the planet gears of the second stage may be made of polyamide, and the ring gear of the second step and the output pinion which is preferably integrally connected thereto may be made of polyoxymethylene.

It should further be added that the first housing part may preferably be formed from metal, in particular steel, or from plastics material permeated with electrically conductive material such as carbon fibres.

Further, at least one of the mounting elements of the motor assembly may be made of a fibre-reinforced plastics material, the reinforcing fibres preferably being formed from an electrically insulating material, for example being glass fibres.

It should moreover be added that the first housing part may be sealed by a base piece at the end thereof remote from the second housing part, it being possible to provide a connecting element, which is used for connection to the stationary base part or to the movable component, on the base piece. The connecting element may for example be screwed to the base piece.

The base piece may for example be fastened to the first housing part using screws. Alternatively, however, it is also possible to fasten the base piece to the first housing part by means of tappets or a bead. Finally, an alternative with particularly simple mounting may involve forming the base piece by flanging or roll-sealing the end of the first housing remote from the second housing part.

Finally, it should also be added that in a constructional variant, which merely comprises the motor assembly (including the sensor unit), the transmission assembly and the adjustment assembly, the drive device is of a length of between approximately 250 mm and approximately 480 mm, preferably a length of between 300 mm and 420 mm, when fully retracted, and is of a length of between approximately 350 mm and approximately 700 mm, preferably a length of between 390 mm and 640 mm, when fully extended. However, there are also constructional variants which comprise further functional assemblies, for example an overload clutch, which protects the drive device or the vehicle from damage by limiting the torque, and/or a brake for increasing the system hysteresis of the drive device, in particular of the adjustment assembly. These constructional variants are up to 30 mm longer in construction, preferably up to 25 mm, as a result of the additional assemblies.

In the following, the invention is explained in greater detail by way of embodiments, with reference to the appended drawings, in which.

Figure 1:
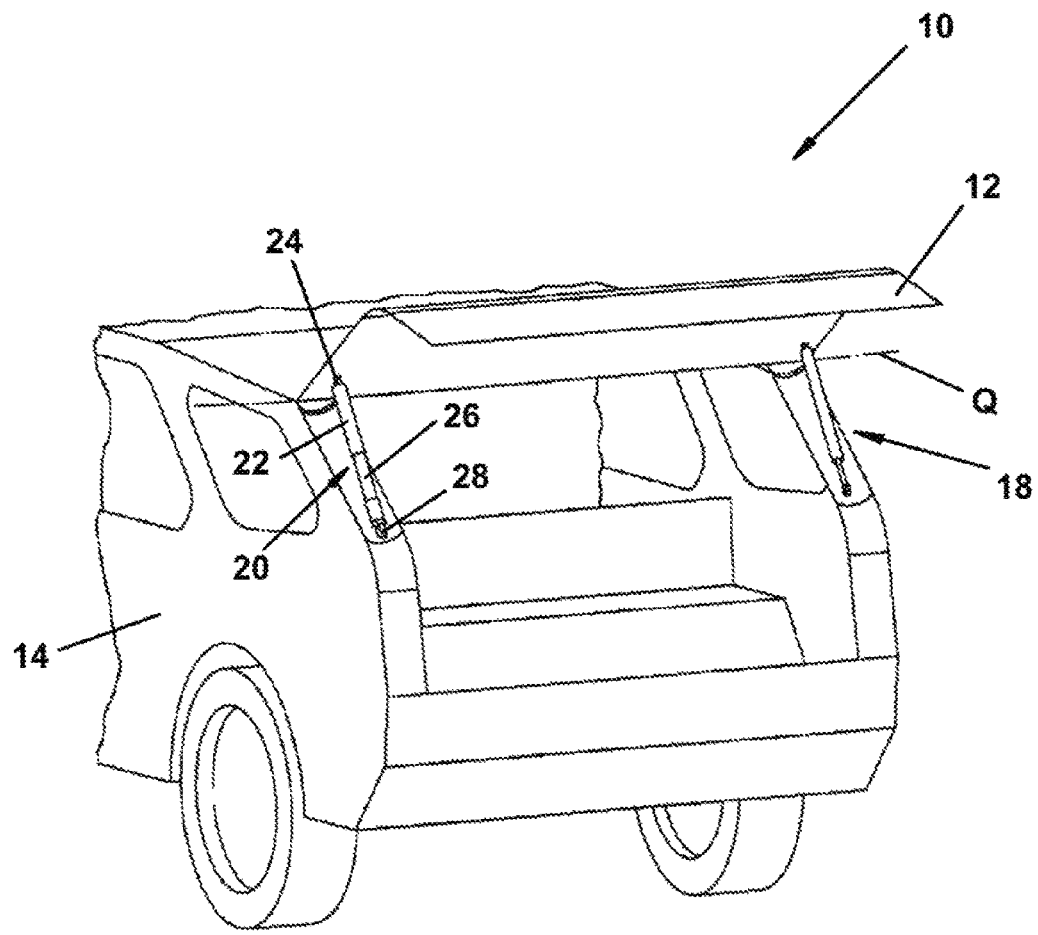
FIG. 1 is a perspective view of the tail of a vehicle equipped with drive devices according to the invention.

FIG. 1 shows the tail of a vehicle 10. A tailgate 12 of the vehicle 10, which is pivotably articulated to the vehicle 10 about a transverse axis Q, is shown open, and thus reveals two drive devices 18 and 20. The drive device 18 may for example be formed by a gas spring, whilst the drive device 20 is a drive device of the type according to the present application, which can be motor-adjusted between a retracted state and an extended state.

In particular the drive device 20 is provided for adjusting the tailgate 12 between a closed state and the open state shown in FIG. 1, it also being possible for the tailgate 12 to take on intermediate positions between these two positions if desired. For this purpose, the drive device 20 comprises a first housing part 22, which is articulated to the tailgate 12 via a connecting part 24, and a second housing part 26, which is guided telescopically in the first housing part 22 and which is articulated to the body 14 of the vehicle 10 via a connecting part 28. In the context of the claims, the tailgate 12 forms the movable component and the body 14 forms the stationary base part.

Figure 2:
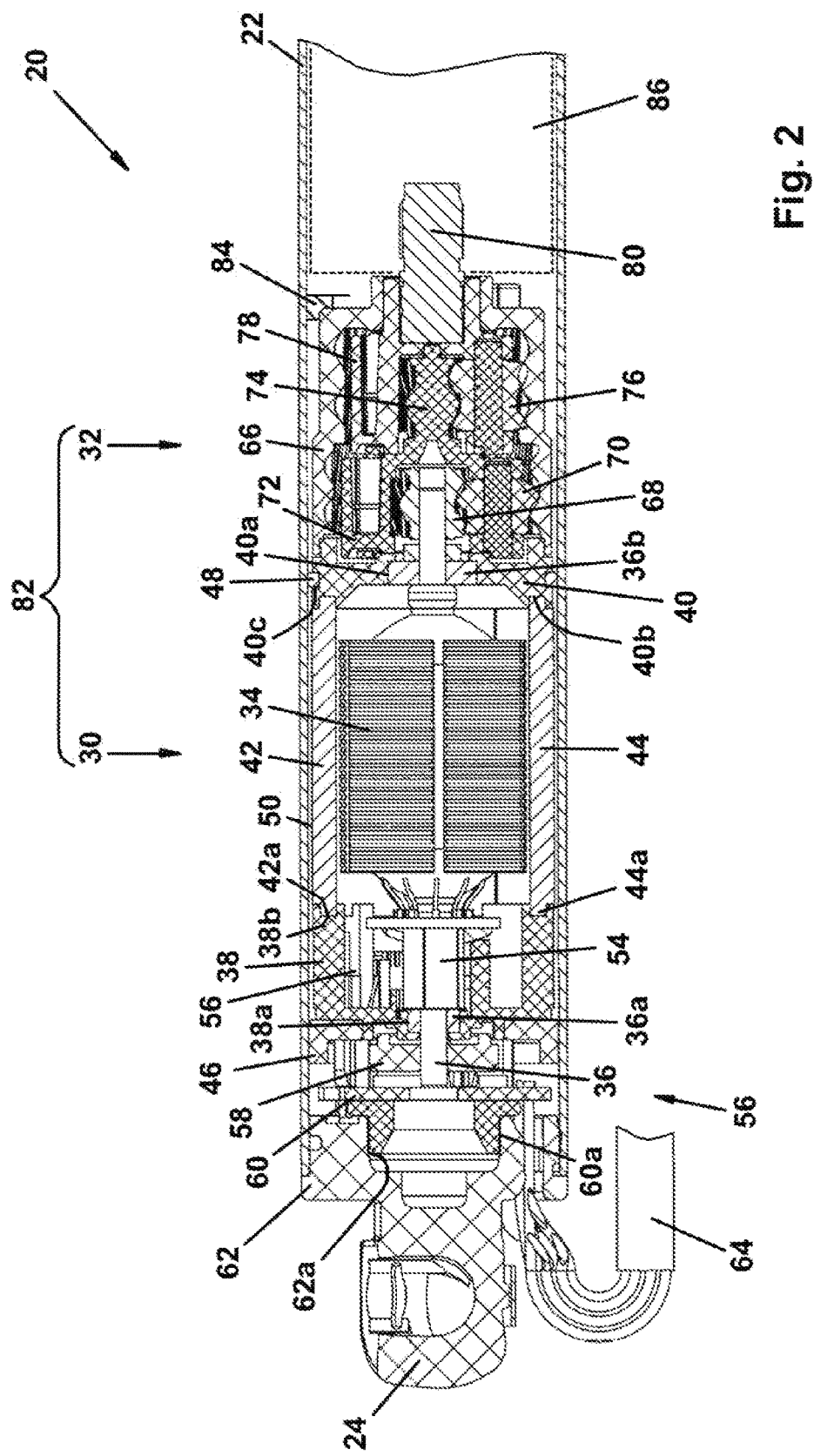
FIG. 2 is a longitudinal section of a part of a first embodiment of a drive device according to the invention.

FIG. 2 shows a first embodiment of a drive device 20 according to the invention in detail. Since the present invention relates mainly to the formation of the motor assembly 30, but also to the formation of the transmission assembly 32 of the drive device 20, and these two components are received in the first housing part 22, only this part of the drive device 20 is shown in FIG. 2.

FIG. 2 also illustrates the rotor 34, which is formed as an armature of the motor assembly 30 and of which the rotor shaft 36 is rotatably mounted in two mounting elements 38 and 40, specifically via rotary bearings 36a and 36b which are received in associated recesses 38a and 40a of the mounting elements 38, 40. The mounting elements 38 and 40 further serve to retain the two permanent magnet shells 42 and 44 of the motor assembly 30. For this purpose, the permanent magnet shells 42, 44 are formed with axial projections 42a, 44a which engage in recesses 38b and 40b respectively of the bearing elements 38, 40. In this context, the recesses 38b, 40b also retain the permanent magnet shells 42, 44 in the radial direction, in such a way that the rotor 34, the bearing elements 38 and 40, and the two permanent magnet shells 42 and 44 form a pre-assembled motor assembly 30. However, this motor assembly 30 only forms a functioning electric motor when it is arranged in the first housing part 22, which is for example formed as a steel tube and which according to the invention takes on the function of the magnetic back iron.

So as to prevent the development of noises which result from the motor assembly 30 stoking internally against the first housing part 22, in particular in applications which are susceptible to vibrations, a damping element 46 or 48 is associated with each of the two mounting elements 38 and 40. The damping element 46 which is associated with the mounting element 38 closest to the connecting part 24 is in the form of a disc, which is preferably made of a resilient material, for example rubber, and the end face of which comes to be positioned against the bearing element 38. By contrast, the damping element 48 associated with the other mounting element 40 is in the form of an O-ring, which is laid in a circumferential groove 40c of the mounting element 40. The O-ring 48 too is preferably made of a resilient material, for example rubber. Further, the external diameters of the mounting elements 38, 40 and the permanent magnet shells 42, 44 when the motor assembly 30 is assembled and the internal diameter of the first housing part 22 are matched to one another in such a way that a gap 50 of a predetermined size is left between the motor assembly 30 and the first housing part 22. The damping elements 46, 48 thus make some movement of the motor assembly 30 in the first housing part 22 possible without resulting in noise-producing contact between the two, and simultaneously damp this relative movement.

Figure 4:
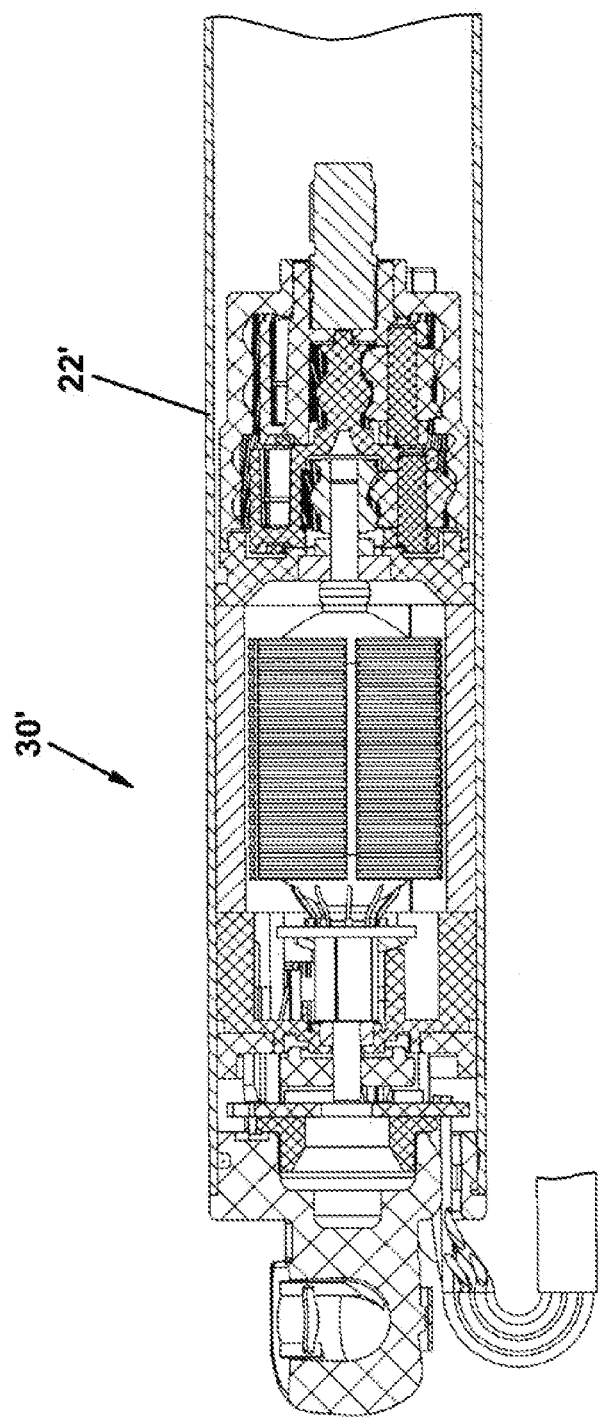
FIG. 4 is a view similar to FIG. 2 of a variant embodiment of the first embodiment.

At this point, it should be noted that the nominal torque losses of the electric motor due to this gap do not exceed a tolerable level. Equally, embodiments are also conceivable in which the motor assembly 30' is inserted into the first housing part 22' with a lower tolerance, in such a way that there is no corresponding gap between the two. An embodiment which is modified in this way is shown in FIG. 4. It is suitable for example for applications which are not very susceptible to vibrations, and has a higher nominal torque at otherwise identical dimensions.

In connection with the motor assembly 30, it should further be noted that the brush-commutator arrangement 52 is also received in the mounting element 38 closest to the connecting part 24, and if required an interference suppressor 54 may additionally be provided.

It should further be noted that, for detecting the direction of rotation of the rotor 34 and/or for detecting the respective rotational position of the rotor 34 and/or for detecting the number of rotations already performed by the rotor 34, in each case with respect to the first housing part 22, a sensor unit 56—comprising a sensor sub-unit 58 fixed to the rotor, which is formed for example by a Hall magnet, and a sensor sub-unit 60 fixed to the stator, which is formed for example by a Hall plate comprising at least one Hall probe—may be associated with the motor assembly 30. As is shown in FIG. 2, the sensor sub-unit 60 fixed to the stator may be centred by means of a shoulder 60a in a recess 62a of a housing cover 62.

FIG. 2 further illustrates a wire harness 64, which contains not only the lines for the sensor unit 56 but also the supply lines for the motor assembly 30.

A further aspect of the invention relates to the cooperation of the motor assembly 30 and the transmission assembly 32. As can be seen from FIG. 2, the transmission assembly 32 comprises a housing 66 in which the components of a two-stage planetary transmission are received, specifically the sun gear or input pinion 68 of the first stage, the planet gears 70 of the first stage, the planet carrier 72 of the first stage, which is formed integrally with the sun gear or input pinion 74 of the second stage, the planet gears 76 of the second stage and the planet carrier 78 of the second stage, which is formed integrally with the output pinion 30 of the transmission assembly. The housing 66 additionally forms the ring gears of both stages of the transmission assembly 32. However, according to the invention, the transmission assembly 32 does not have a separate housing cover. This function is instead taken on by the mounting element 40 of the motor assembly 30 which is remote from the connecting piece 24.

After the pre-assembly of the motor assembly 30, the transmission assembly 32 can be pre-assembled next, the final assembly step involving placing the motor assembly 30 on the transmission assembly 32 as the housing cover. In this state, the motor assembly 30 and the transmission assembly 32 together form a drive unit 82 of the drive device 20.

So as to be able to facilitate the joining of the motor assembly 30 and the transmission assembly 32, in a first step of assembling the motor assembly 30 the input pinion 68 of the transmission assembly 32 can be fastened to the shaft 36 of the rotor 34. However, so as subsequently to be able to place the mounting element 40 on the rotor shaft 36, the internal diameter of the recess 40a has to be dimensioned slightly larger than the external diameter of the input pinion 68.

In principle, it is conceivable also to associate a separate damping element with the transmission assembly 32, for example on the end thereof remote from the motor assembly 30, as is shown highly schematically at 84 in FIG. 2. In accordance with a first embodiment, this damping element 84 may be formed in a disc shape or cup shape. However, it is also possible to form it as an O-ring which is received in a circumferential groove of the transmission housing 66. Preferably, a resilient material is also used for the damping element 84, for example rubber. In this case, if desired, the damping element 48 can be omitted if the damping element 84 is provided.

It should also be added that an adjustment assembly 86 of the drive device 20 follows the thread assembly 32 in the output direction, and may be formed for example by a spindle drive, which is known per se and is therefore merely shown in dashed lines in FIG. 2. The adjustment assembly 86 takes the rotational movement, reduced by the transmission assembly 32, of the rotor 34 of the motor assembly 30 from the output pinion 80 of the transmission assembly 32, and derives therefrom the relative displacement movement of the first housing part 22 and the second housing part 24.

Figure 3:
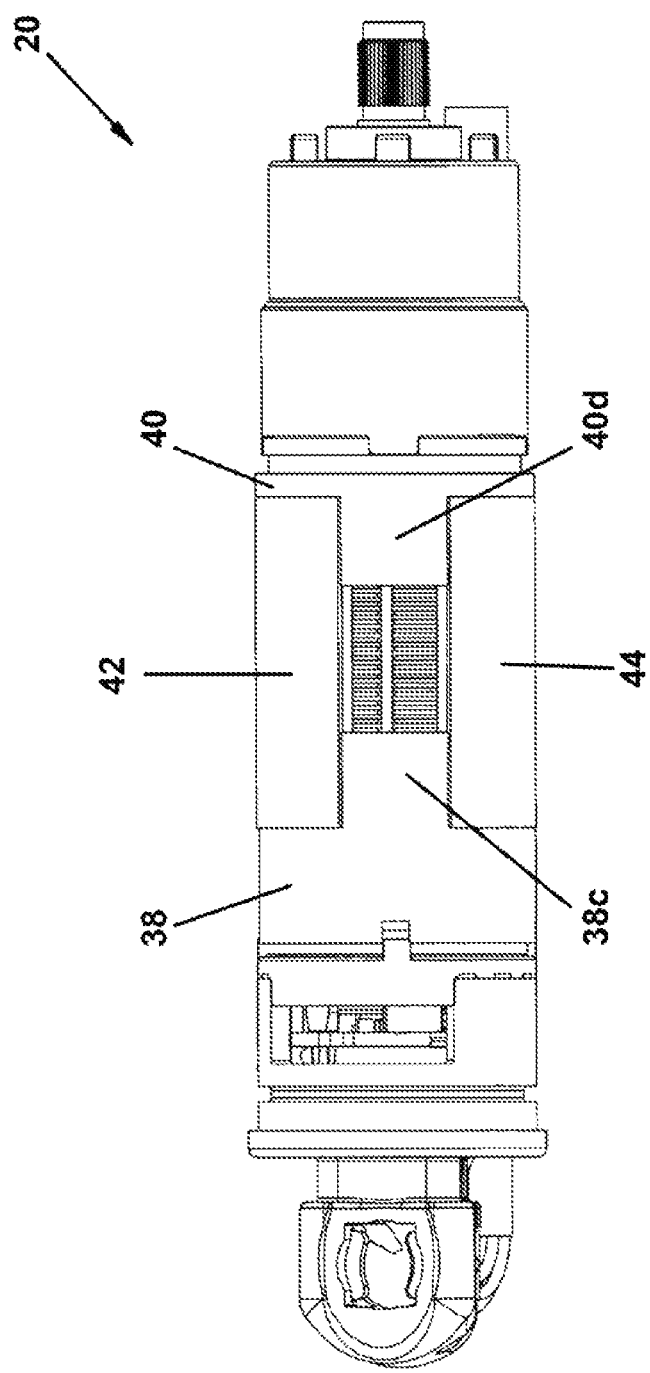
FIG. 3 is a side view of the embodiment in accordance with FIG. 2, but with the first housing part removed.

FIG. 3 illustrates that the mounting elements 38 and 40 comprise axial projections 38c and 40d, which extend in between the permanent magnet shells 42, 44 and hold them at a distance from one another in the circumferential direction in the respective operating positions thereof.

Figure 5:
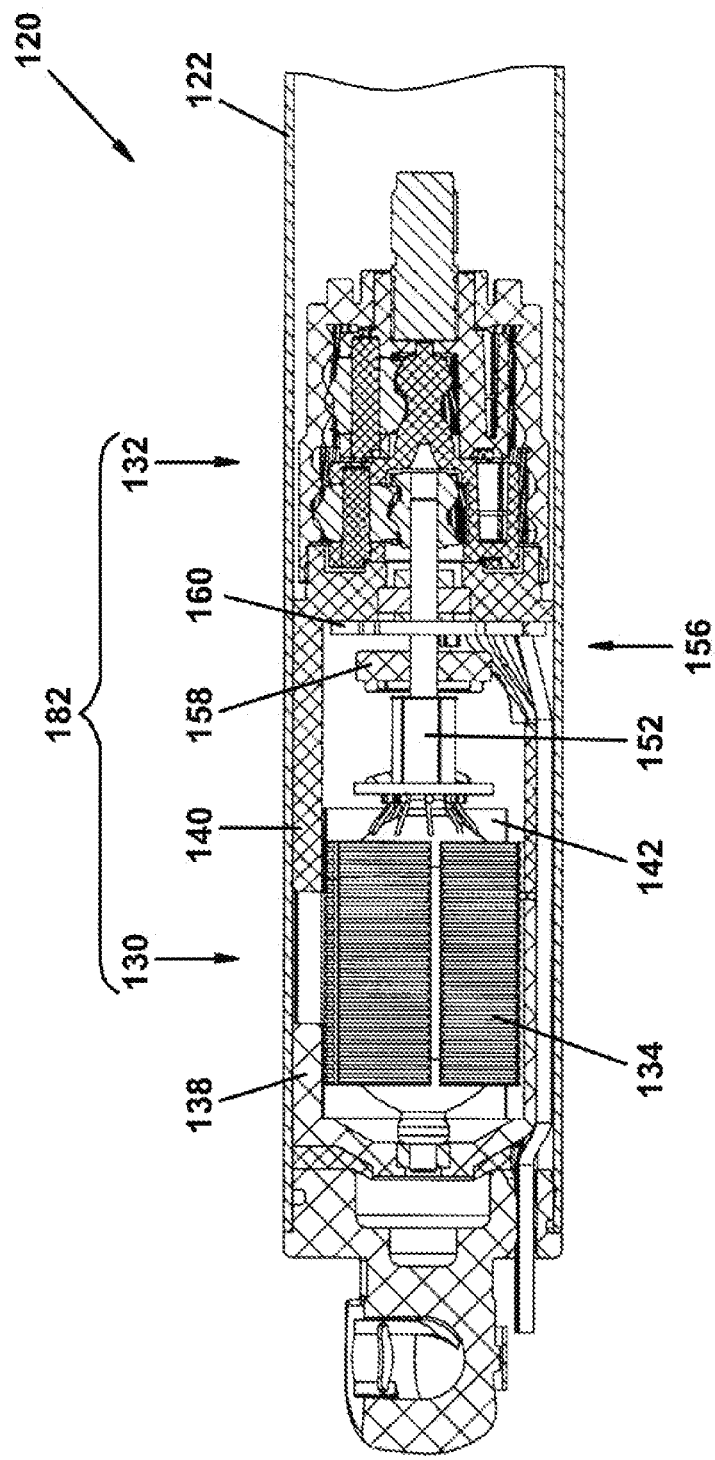
FIG. 5 is a view similar to FIG. 2 of a second embodiment of the drive device according to the invention.
Figure 6:
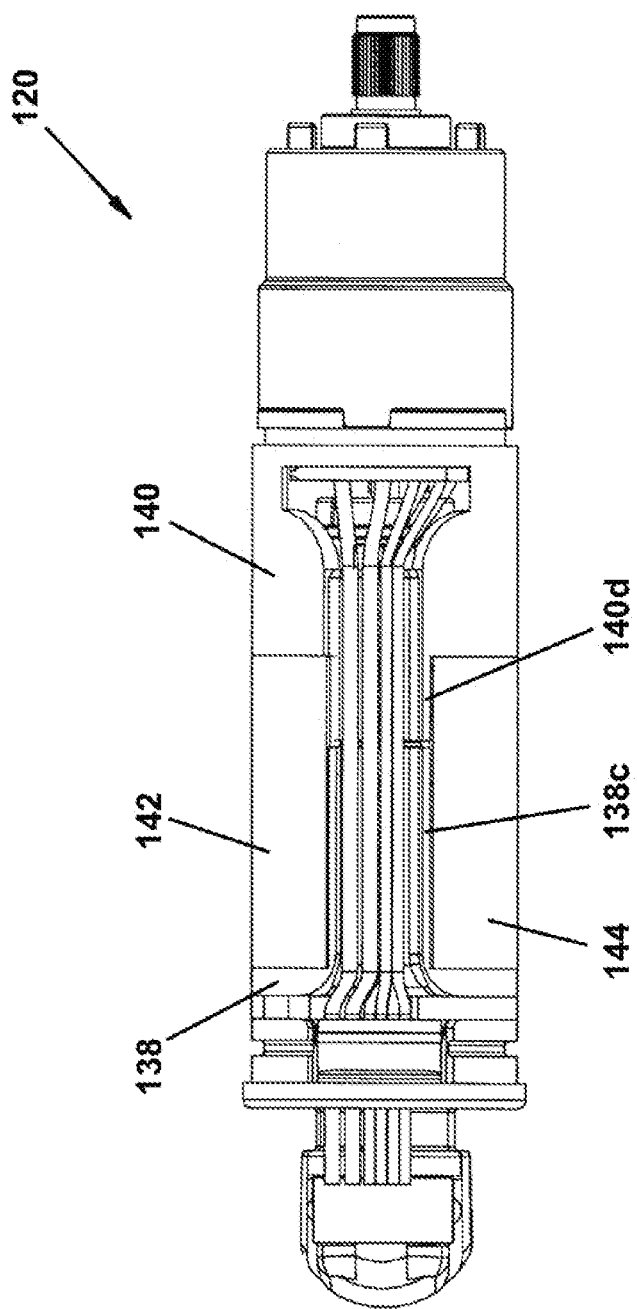
FIG. 6 is a view similar to FIG. 3 of the second embodiment.

FIGS. 5 and 6 show a second embodiment of a drive device according to the invention, which substantially corresponds to the embodiment in accordance with FIGS. 2 and 3. Analogous parts are therefore provided with the same reference numerals as in FIGS. 2 and 3, but increased by 100. Further, the drive device 120 in accordance with FIGS. 5 and 6 will only be described in the following in so far as it differs from the drive device 20 of FIGS. 2 and 3, to the description of which reference is otherwise explicitly to be made.

The drive device 120 in accordance with FIGS. 5 and 6 differs from the drive device 20 of FIGS. 2 and 3, on the one hand, in that the sensor unit 156 comprising the sensor sub-unit 158 fixed to the rotor and the sensor sub-unit 160 fixed to the stator is arranged between the motor assembly 130 and the transmission assembly 132. As a result, although the drive unit 182 cannot necessarily be formed shorter, this facilitates the arrangement of the lines in the interior of the drive device 120.

As can be seen in FIG. 2, only a little constructional space is available for the lines which proceed from soldering points on the circuit board of the sensor sub-unit 60 fixed to the stator, so as to be able to divert them in the desired direction, on the one hand, and provide them with the necessary strain relief, on the other hand. This problem is encountered increasingly the more the soldering material not only wets the line wires at the soldering point, but also wets the wires over some distance away from the soldering point as a result of capillary forces, when the lines are soldered in place on the circuit board. After cooling, this soldering material solidifies the wires, and this makes them not only less flexible, but also more likely to break.

This problem does not occur in the embodiment of FIGS. 5 and 6, since the lines are guided over a greater path length in the drive device 120. Therefore, sufficient distance from the welding points can be maintained before the lines are diverted in the desired direction. Further, sufficient line length is available to provide the required strain relief.

In addition, no additional radial constructional space has to be provided for the additional line portions which extend inside the first housing part 122. The lines can, in a simple manner, be laid where the axial projections 138c and 140d of the mounting elements 138 and 140 project in between the permanent magnet shells 142, 144 (see also FIG. 6). Here, the axial projections 138c and 140d are not of the same radial thickness as the permanent magnet shells 142, 144, but instead merely provide a protective covering, which ensures that the lines cannot come into contact with the rotor 134. For this purpose, they advantageously extend far enough in between the permanent magnet shells 142, 144 that the end faces thereof are virtually positioned against one another.

On the other hand, however, the drive device 120 in accordance with FIGS. 5 and 6 also differs from the drive device 20 of FIGS. 2 and 3 in that the rotor 134 is received in the reverse orientation in the first housing part 122, in other words the brush-commutator arrangement 152 thereof is arranged on the side facing the transmission assembly 132. This similarly fails to save constructional length. However, the same considerations apply to the supply lines leading to the brushes (not visible in FIG. 5 because of the sectional view) as to the lines leading to the sensor sub-unit 160 fixed to the stator.

Figure 7:
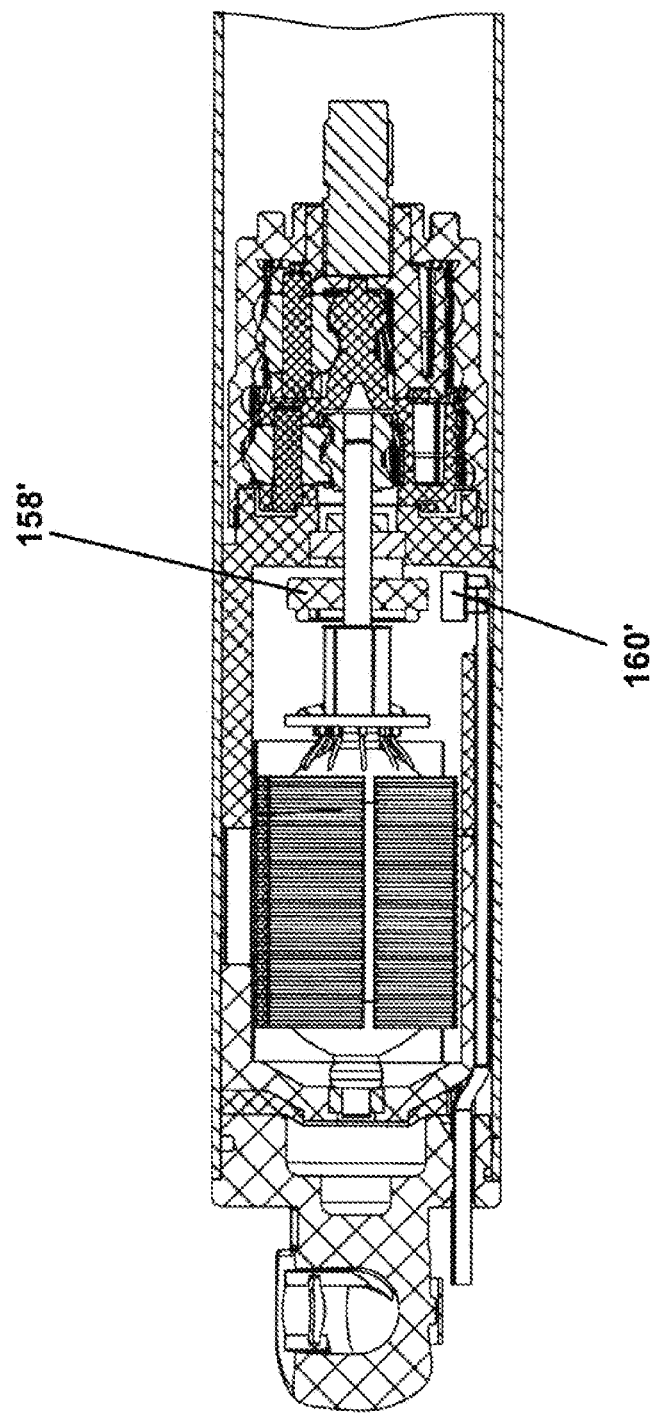
FIG. 7 is a view similar to FIG. 2 of a variant embodiment to the second embodiment.

However, as can be seen from FIG. 7, which shows a modification of the embodiment of FIGS. 5 and 6, some constructional length can be saved if the sensor sub-unit 160' fixed to the stator is arranged radially outside the sensor sub-unit 158' fixed to the rotor.

It should be noted that other embodiments are also conceivable in which merely the sensor unit or merely the brush-commutator arrangement is arranged on the side of the motor assembly facing, the transmission assembly.

FIGS. 8 to 11 show a third embodiment of a drive device according to the invention, which substantially corresponds to the embodiment in accordance with FIGS. 2 and 3. Analogous parts are therefore provided with the same reference numerals as in FIGS. 2 and 3, but increased by 200. Further, the drive device 220 in accordance with FIGS. 8 to 11 will only be described in the following in so far as it differs from the drive device 20 of FIGS. 2 and 3, to the description of which reference is otherwise explicitly to be made.

Figure 8:
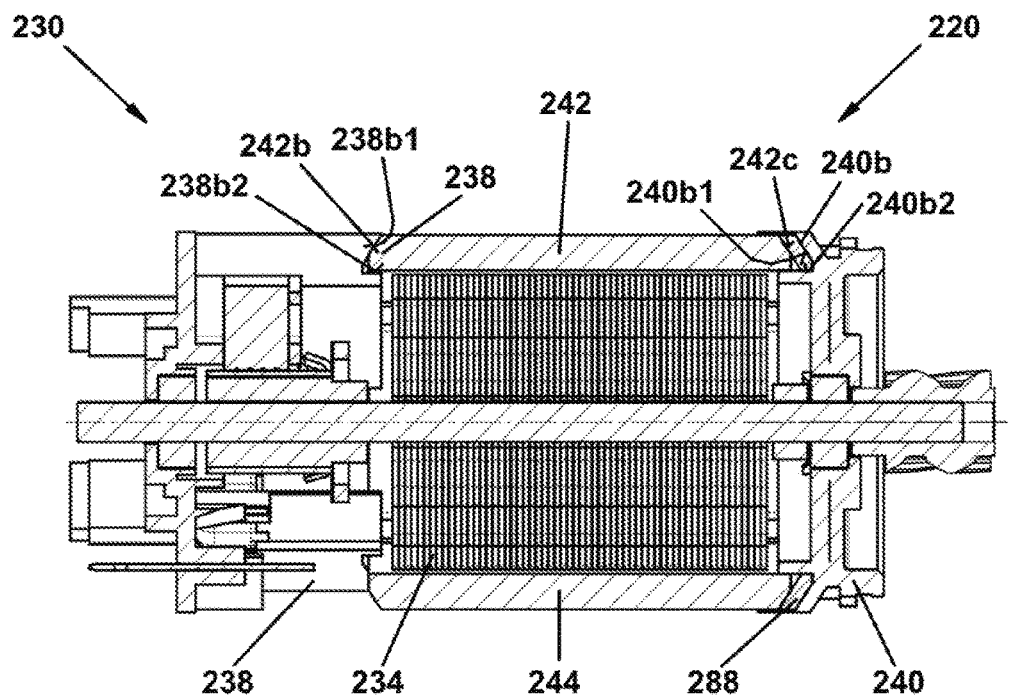
FIG. 8 is a longitudinal section of the motor assembly of a third embodiment of a drive device according to the invention.

More precisely. FIG. 8 shows the motor assembly 230 of the drive device 220.

A first difference from the motor assembly 30 in accordance with FIG. 2 is that the recesses 238b, 240b of the mounting elements 238, 240 are formed in a wedge shape, and in particular comprise a wedge-shaped boundary face 238b1, 240b1 radially outwards. Whilst the wedge face 238b1 is positioned directly against a counter wedge face 242c of a permanent magnet shell 242, the wedge face 240b1 is only positioned indirectly against the counter wedge face 242c of the permanent magnet shell 242, specifically by way of a compensation element 288 which is discussed in greater detail in the following. The radial position of the permanent magnet shell 242 is fixed by positioning it on support faces 238b2, 240b2 of the recesses 238b, 240b. Analogous counter wedge faces may also be provided on the other permanent magnet shell 244.

The aforementioned compensation element 288 provides the second difference from the motor assembly 30 in accordance with FIG. 2. One function of the compensation element 288 is to provide an axial length compensation between the spacing of the mounting elements 238, 240 and the length of the permanent magnet shell 242, which may differ from one another as a result of manufacturing tolerances. For this purpose, the compensation element 233 is formed so as to be compressible in the axial direction.

Figure 9:
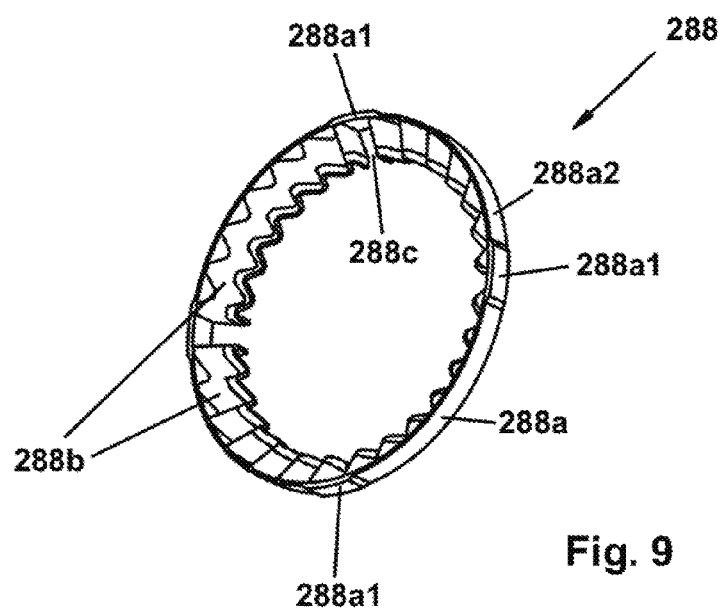
FIG. 9 is a perspective view of a compensation element as used in the third embodiment.

In accordance with the embodiment shown in FIG. 9, the compensation element 288 is formed in an annular shape, with an annular body 288a extending over the entire circumference and a plurality of undulating portions 288b, four in the embodiment shown, which are formed on the inner face of the annular body 288a and provide the compressibility of the compensation element 288.

Figure 10:
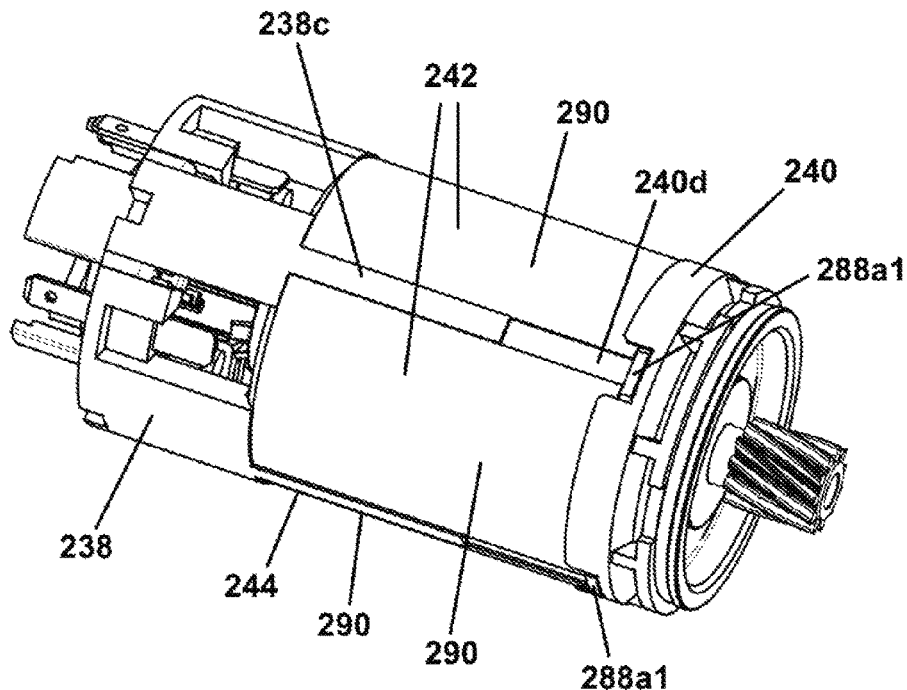
FIG. 10 is a perspective view of the motor assembly in accordance with FIG. 8.

A third difference is that the two permanent magnet shells 242, 244, which each extend over a circumferential angle of approximately 180°, are not formed in a single piece, as can be seen from FIG. 10, but instead each comprise two permanent magnet elements 290 which extend over a circumferential angle of approximately 90°. In this context, both the two permanent magnet shells 242, 244 and the two permanent elements 290 of a permanent magnet shell 242, 244 are separated from one another by projections 238c, 240d of the mounting elements 238, 240. In the drawing, it would also be possible to neglect completely to refer to the permanent magnet shells 242, 244, since, as is known to the person skilled in the art of electric motors, the functionality of the electric motor ultimately merely depends on the rotor 234 (see FIG. 8) being surrounded by permanent magnetic material over substantially the entire circumference thereof, and this is ensured by the four permanent magnet elements 290 in the present case.

FIG. 10 further illustrates two circumferential portions 288a1 of the annular body 288a of the compensation element 283, which project over the mounting element 240 in the radial direction. In accordance with FIG. 8, two circumferential portions 288a1 of this type, which are adjacent in the circumferential direction, are connected by a further circumferential portion 288a2 of the annular body 288a. The undulating portions 288b are formed on the inner face of the further circumferential portions 288a2, whilst breaks 238c, through which the projections 240d of the mounting element 240 pass when mounted, are provided on the inner face of the radially projecting circumferential portions 288a1. As a result, the compensation element 288 is secured on the mounting element 240, in such a way that the circumferential portions 288a1 which project in the radial direction can serve to centre the mounting element 240 and thus the entire rotor 234 in the first housing part.

Figure 11:
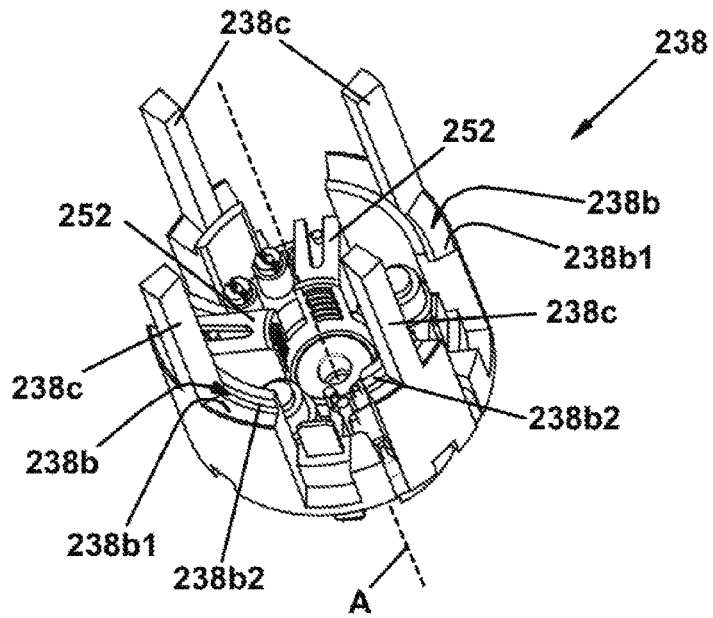
FIG. 11 is a perspective view of one of the mounting elements of the motor assembly of the third embodiment.

A fourth difference is shown in FIG. 11. Specifically, the directions in which the brushes 252a of the brush-commutator arrangement are orientated with respect to the axis A form an angle of substantially 90°. Accordingly, the commutator of the brush-commutator arrangement and the rotor 234 are formed with six poles.

It should be noted that the four differences mentioned in the above are completely independent of one another. Thus, a compensation element could advantageously be used even if the permanent magnet shells or the permanent magnet elements and the mounting elements are not formed with cooperating wedge faces, but for example stepped, as is shown in FIG. 2, or even with continuous end faces extending orthogonal to the axis of rotation.

Further, a compensation element of this type and/or the wedge face of the cooperating end faces can advantageously be used even if the two permanent magnet shells are each formed in a single piece.

The 90° arrangement of the brushes and the six-pole formation of the commutator and the rotor can likewise be used in the first and/or the second embodiment.

The invention claimed is:

1. A drive device, comprising:
a first housing part having a connector configured to connect to one of a stationary base part and a movable component,
a second housing part arranged substantially coaxial with the first housing part, configured to connect to the respective other of the stationary base part and the movable component, and directly or indirectly displaceably guided on the first housing part in an axial direction relative thereto, and
a drive unit received in the first housing part and comprising a motor assembly for bringing about a relative displacement movement of the first housing part and the second housing part,
the motor assembly comprising a rotor having a rotor shaft, two mounting elements for mounting the two ends of the rotor shaft, and two permanent magnet shells held on the mounting elements,
wherein the motor assembly is received directly in the first housing part, and the first housing part is made of a magnetisable material at least in a length portion associated with the motor assembly, wherein at least one of the mounting elements comprises a holding recess holding at least one of the permanent magnet shells, and a wedge face cooperating with an associated counter wedge face on an axial longitudinal end of the at least one permanent magnet shell to hold the at least one permanent magnet shell in a defined radial position on the mounting element, and wherein the wedge face is inclined such that a radially outer edge of the wedge face is closer to the other respective mounting element than a radially inner edge of the wedge face extends increasingly radially outwards in a direction pointing towards a respective other axial longitudinal end of the at least one permanent magnet shell.

2. The drive device according to claim 1,
wherein at least one of the mounting elements comprises at least one axial shoulder that projects in between the permanent magnet shells.

3. The drive device according to claim 1, wherein the holding recess and the wedge face are on an end face of the at least one mounting element.

4. The drive device according to claim 1, wherein the holding recess and the wedge face cooperate in an interlocking manner, at least in the radial direction, with a permanent magnet shell associated therewith.

5. The drive device according to claim 1,
further comprising a compensation element that is resiliently compressible in the axial direction and is provided on at least one axial longitudinal end of the at least one permanent magnet shell between the permanent magnet shell and the mounting element.

6. The drive device according to claim 5,
wherein the compensation element is in the form of a ring extending over the entire circumference.

7. The drive device according to claim 6,
wherein two adjacent undulating portions of the compensation element are connected by means of a circumferential portion of the ring that projects in the radial direction over circumferential portions of the ring that are adjacent thereto.

8. The drive device according to claim 1,
wherein a damping element is associated with at least one mounting element.

9. The drive device according to claim 1,
wherein electrical connecting lines for the motor assembly are led away from the drive device in an axial or radial direction.

10. The drive device according to claim 1,
wherein at least one of the permanent magnet shells comprises at least two permanent magnet elements.

11. The drive device according to claim 1,
wherein the drive unit further comprises a transmission assembly connected to an output side of the motor assembly, the relative displacement movement of the first housing part and the second housing part being derived from a rotational movement of an output shaft of the transmission assembly, and wherein the mounting element of the motor assembly closest to the transmission assembly simultaneously forms a housing cover of the transmission assembly.

12. The drive device according to claim 11,
wherein the internal diameter of a central opening, for passing the rotor shaft through, of the mounting element closest to the transmission assembly is dimensioned at least as large as the external diameter of an input pinion of the transmission assembly.

13. The drive device according to claim 11,
wherein a damping element is provided on the end of the transmission assembly remote from the motor assembly.

14. The drive device according to claim 11,
wherein the motor assembly further comprises a brush-commutator arrangement, wherein the brush-commutator arrangement is arranged on the side of the motor assembly facing the transmission assembly.

15. The drive device according to claim 11,
wherein the motor assembly further comprises a sensor unit having a sensor sub-unit fixed to the rotor and a sensor sub-unit fixed in an axial recess of one of the mounting elements.

16. The drive device according to claim 15,
wherein the sensor unit is arranged on the end of the motor assembly remote from the transmission assembly.

17. The drive device according to claim 15,
wherein the sensor unit is arranged between the motor assembly and the transmission assembly.

18. The drive device according to claim 15,
wherein the sensor sub-unit fixed in the axial recess of one of the mounting elements is arranged radially outside the sensor sub-unit fixed to the rotor.

* * * * *